United States Patent [19]
Urbach

[11] Patent Number: 6,042,294
[45] Date of Patent: Mar. 28, 2000

[54] BALL JOINT HAVING ROTATIONAL AND AXIAL MOVEMENT

[75] Inventor: Brian A. Urbach, Rochester Hills, Mich.

[73] Assignee: TRW Inc., Lyndhurst, Ohio

[21] Appl. No.: 09/197,895

[22] Filed: Nov. 23, 1998

[51] Int. Cl.[7] ....................................... F16C 11/00
[52] U.S. Cl. ........................ 403/135; 403/122; 403/134
[58] Field of Search ................... 403/122, 134, 403/135, 137, 138, 140, 144

[56] References Cited

U.S. PATENT DOCUMENTS

| | | |
|---|---|---|
| 844,421 | 2/1907 | Stafford . |
| 3,104,117 | 9/1963 | Pierce . |
| 3,127,192 | 3/1964 | Traugott et al. . |
| 3,129,023 | 4/1964 | Fierstine . |
| 4,482,266 | 11/1984 | Kaneko . |
| 5,066,159 | 11/1991 | Urbach . |
| 5,195,605 | 3/1993 | Wood . |

*Primary Examiner*—Lynne H. Browne
*Assistant Examiner*—John R. Cottingham
*Attorney, Agent, or Firm*—Tarolli, Sundheim, Covell, Tummino & Szabo L.L.P.

[57] ABSTRACT

A ball joint (10) supports a first suspension member (14) for movement relative to a second suspension member (40). The first and second suspension members (14, 40) define a steering axis (30). The ball joint (10) comprises a ball stud (100) and a socket (60) having a chamber (74). A bearing (80) is located in the chamber (74). The ball stud (100) has a shank portion (102) for connecting the ball stud for movement with the first suspension member (14). The socket (60) has a mounting portion (64) for connecting the socket for movement with the second suspension member (40). The ball stud (100) has a ball end portion (110) received in the bearing (80) and rotatable in the bearing to provide for relative movement between the first and second suspension members (14, 40). The ball stud (100) and the bearing (80) are movable together in the chamber (74) relative to the socket (60) and the second suspension member (40) in a direction parallel to the steering axis (30).

1 Claim, 3 Drawing Sheets

BALL JOINT HAVING ROTATIONAL AND AXIAL MOVEMENT

BACKGROUND OF THE INVENTION

1. Technical Field

The present invention relates to a ball joint for supporting a first suspension member for movement relative to a second suspension member. In particular, the present invention relates to a ball joint which can accommodate misalignment or tolerance stackup between two suspension members during assembly of the suspension members with the ball joint.

2. Description of the Prior Art

A typical motor vehicle suspension includes a plurality of members, such as control arms, steering knuckles, etc., which are interconnected for relative movement by ball joints. Each suspension member is manufactured to certain tolerances. Tolerance stackup in two suspension members can produce misalignment of the suspension members, placing undesired loads on the ball joint after the suspension is assembled.

SUMMARY OF THE INVENTION

The present invention is a ball joint for supporting a first suspension member for movement relative to a second suspension member. The first and second suspension members define a steering axis. The ball joint comprises a ball stud and a socket having a chamber. A bearing is located in the chamber. The ball stud has a shank portion for connecting the ball stud for movement with the first suspension member. The socket has a mounting portion for connecting the socket for movement with the second suspension member. The ball stud has a ball end portion received in the bearing and rotatable in the bearing to provide for relative movement between the first and second suspension members. The ball stud and the bearing are movable together in the chamber relative to the socket and the second suspension member in a direction parallel to the steering axis.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
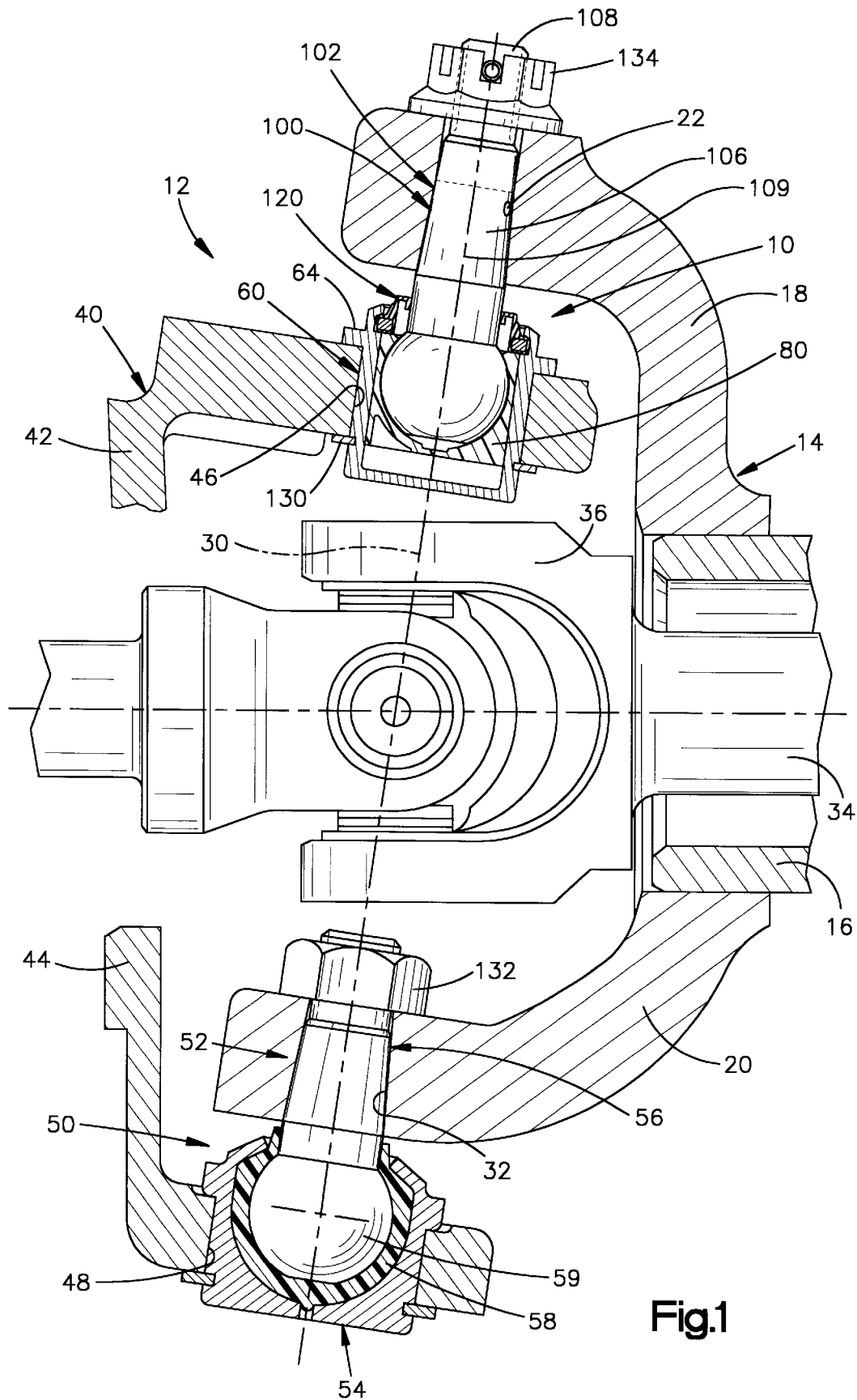
FIG. 1 is a schematic illustration of a portion of a vehicle suspension including a ball joint constructed in accordance with the present invention.

The present invention relates to a ball joint for supporting a first suspension member for movement relative to a second suspension member. The present invention is applicable to various ball joint constructions. As representative of the invention, FIG. 1 illustrates a ball joint 10.

The ball joint 10 is an upper ball joint of a vehicle suspension 12 of a generally conventional construction. The suspension 12 includes a first suspension member or steering yoke 14 fixed to the vehicle frame or body (not shown). The steering yoke 14 has a central portion 16 and upper and lower arms 18 and 20.

The upper steering yoke arm 18 has a tapered opening 22. A corresponding tapered opening 32 is formed in the lower steering yoke arm 20. The openings 22 and 32 define a steering axis 30 of the suspension 12, on which the openings 22 and 32 are preferably centered.

An engine driven shaft 34 extends through the central portion 16 of the steering yoke 14. The driven shaft 34 has a universal joint 36. The driven shaft 34 is connected with a vehicle road wheel (not shown) supported for rotation on a second suspension member or steering knuckle 40.

The steering knuckle 40 has an upper arm 42 and a lower arm 44. The upper steering knuckle arm 42 has an opening 46. The opening 46 has a cylindrical configuration preferably centered on the steering axis 30. A corresponding opening 48 is formed in the lower steering knuckle arm 44. The opening 48 has a cylindrical configuration preferably centered on the steering axis 30.

Because of manufacturing tolerances, the upper and lower openings 22 and 32 in the steering yoke 14 may not be coaxial, but may instead be misaligned by a few degrees. Similarly, because of manufacturing tolerances, the upper and lower openings 46 and 48 in the steering knuckle 40 may not be coaxial, but may instead be misaligned by a few degrees relative to each other and/or to the openings 22 and 32 in the steering yoke 14. Further, the distance between the upper steering yoke arm 18 and the upper steering knuckle arm 42, as measured along the steering axis 30, may vary because of manufacturing tolerances.

A lower ball joint 50 joins the lower steering yoke arm 20 and the lower steering knuckle arm 44. The lower ball joint 50 is of a conventional construction and includes a ball stud 52 and a socket 54. The ball stud 52 has a shank portion 56 which is fixed in the opening 32 in the lower steering yoke arm 20. The shank portion 56 connects the ball stud 52 for movement with the lower steering yoke arm 20. The socket 54 is fixed in the opening 48 in the lower steering knuckle arm 44. The socket 54 is thus connected for movement with the lower steering knuckle arm 44.

A bearing 58 is located in the socket 54 of the lower ball joint 50. The ball stud 52 has a ball end portion 59 received in the bearing 58 and rotatable in the bearing to provide for relative rotation between the lower steering knuckle arm 44 and the lower steering yoke arm 20.

The upper ball joint 10 (FIG. 2) includes a socket 60. The socket 60 is made from metal and has a cylindrical side wall 62. A mounting flange 64 extends radially outward from the side wall 62 of the socket 60, at an open end of the socket. The mounting flange 64 has parallel, radially extending outer and inner side surfaces 66 and 68. A rim 70 of the socket 60 projects from the outer side surface 66 of the mounting flange 64. A radially extending end wall 72 of the socket 60 is located opposite the rim 70 and defines a closed end of the socket.

The side wall 62 and end wall 72 of the socket 60 define a chamber 74 in the socket. A bearing 80 is located in the chamber 74. The bearing 80 is made from a known plastic material suitable for use as a ball joint bearing. The bearing 80 has a cylindrical outer surface 82 in sliding engagement with the cylindrical side wall 62 of the socket 60. The bearing 80 has a spherical inner surface 84 centered on a pivot center 86 and defining a spherical cavity 88 in the bearing 80.

The bearing 80 has a radially extending end wall 90 on which is a first radially extending end surface 92 of the bearing. The end surface 92 is spaced apart from the end wall 72 of the socket 60, defining an open space 94 between them. The bearing 80 has at its opposite end a second end surface 96. The second end surface 96 of the bearing 80 is approximately coplanar with the outer side surface 66 of the mounting flange 64 of the socket 60, when the parts of the upper ball joint 10 are in the condition shown in FIG. 2.

The upper ball joint 10 also includes a ball stud 100. The ball stud 100 has a shank portion 102. The shank portion 102 includes a cylindrical first section 104, a tapered second section 106, and a threaded end section 108 (FIG. 1), all centered on a longitudinal axis 109 of the ball stud 100. The axis 109 extends through the pivot center 86 of the bearing 80.

The ball stud 100 has a spherical ball end portion 110 fixed for movement with the shank portion 102 of the ball stud. The ball end portion 110 has a spherical outer surface 112 and is received in the cavity 88 in the bearing 80. The spherical outer surface 112 of the ball end portion 110 is in sliding engagement with the spherical inner surface 84 of the bearing 80. The shank portion 102 of the ball stud 100 projects from the ball end portion 110 and the bearing 80, out of the open end of the socket 60.

A seal 120 is interposed between the socket 60 and the ball stud 100. The seal 120 is made from an elastomeric material. A first portion 122 of the seal 120 is molded around a metal retaining ring 124. The rim 70 of the socket 60 is rolled over to clamp the first seal portion 122, including the retaining ring 124, between the socket rim and the outer side surface 66 of the mounting flange 64 of the socket. The elastomeric material of the first seal portion 122 thus seals against the socket 60 of the upper ball joint 10.

A second portion 126 of the seal 120 projects radially inward from the first portion 122 of the seal. The second portion 126 engages the first section 104 of the shank portion 102 of the ball stud 100. A seal is thereby effected between the ball stud 100 and the socket 60, to prevent the ingress of foreign material into the socket.

In assembly of the vehicle suspension 12, the lower ball joint 50 is secured to the steering knuckle 40. The socket 60 of the upper ball joint 10 is pressed into the upper steering knuckle arm 42. A clip 130 retains the socket 60 in the upper steering knuckle arm 42. The upper ball joint 10 is thus secured to the steering knuckle 40.

The steering knuckle 40 is then joined with the steering yoke 14 so that the shank portion 56 of the lower ball joint stud 52 extends into the opening 32 in the lower steering yoke arm 20 and the shank portion 102 of the upper ball joint stud 100 extends into the opening 22 in the upper steering yoke arm 18. A nut 132 is screwed onto the shank portion 56 of the lower ball joint stud 52, securing the stud 52 to the lower steering yoke arm 20. A nut 134 is screwed onto the shank portion 102 of the upper ball joint stud 100, securing the stud 100 to the upper steering yoke arm 18.

When the lower ball joint 10 is assembled between the lower steering yoke arm 20 and the lower steering knuckle arm 44, the distance between the upper steering yoke arm 18 and the upper steering knuckle arm 42, as measured along the steering axis 30, may vary because of manufacturing tolerances. This variability is accommodated by movement of the bearing 80 and the ball stud 100 in the socket 60 of the upper ball joint 10, in a direction parallel to the steering axis 30.

Figure 2:
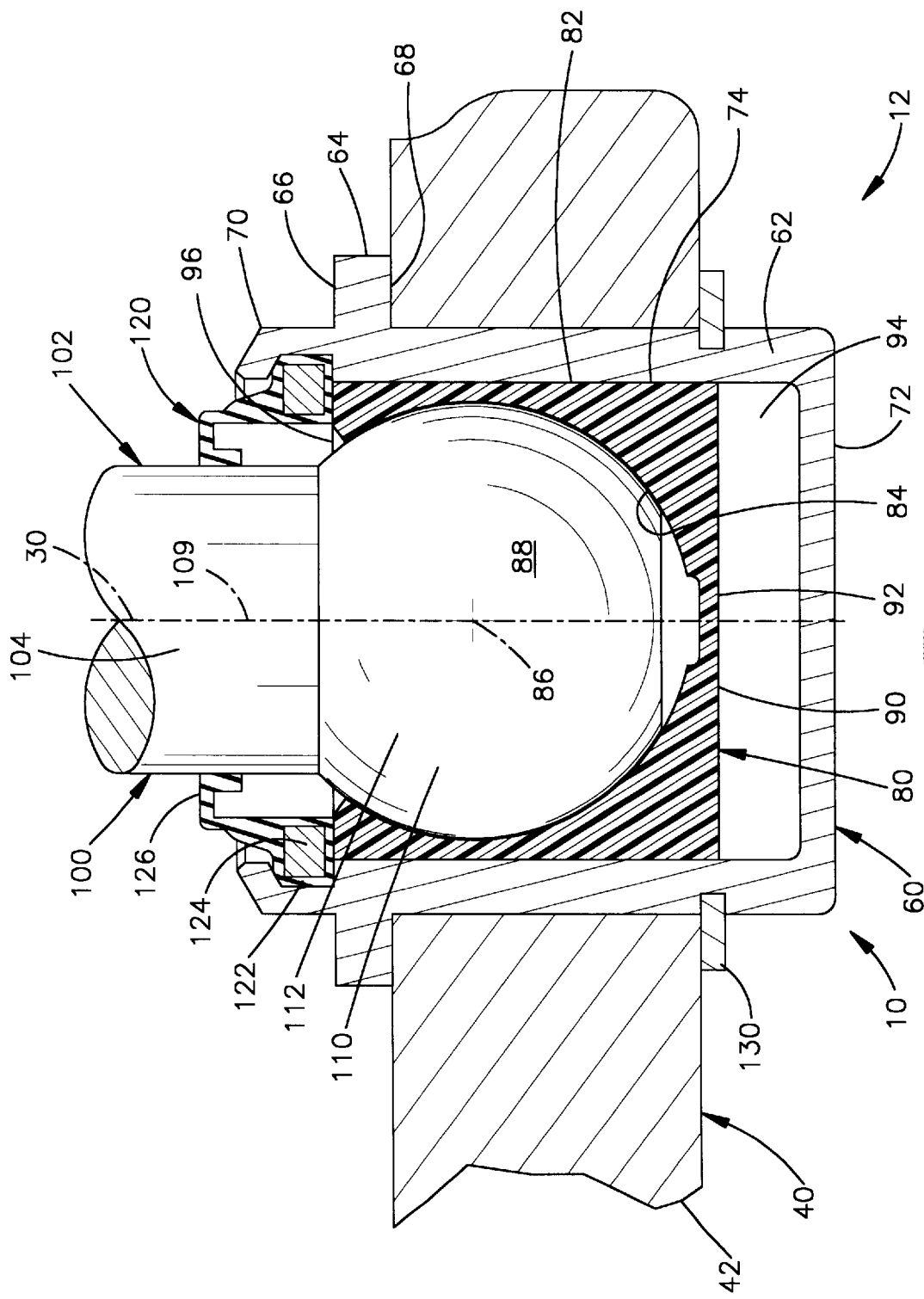
FIG. 2 is an enlarged view of the ball joint of FIG. 1, shown in a first condition of assembly of the vehicle suspension.

Specifically, if the upper steering yoke arm 18 is relatively far from the upper steering knuckle arm 42, then the upper ball joint 10 assumes a condition as shown in FIG. 2. In this condition, the ball stud 100 and the bearing 80 are positioned in the socket 60 so that the bearing is in engagement with or close to the first portion 122 of the seal 120. The end surface 92 on the bearing end wall 90 is spaced apart from the end wall 72 of the socket 60. A relatively large open space 94 is defined between the end wall 90 of the bearing 80 and the end wall 72 of the socket 60.

Figure 3:
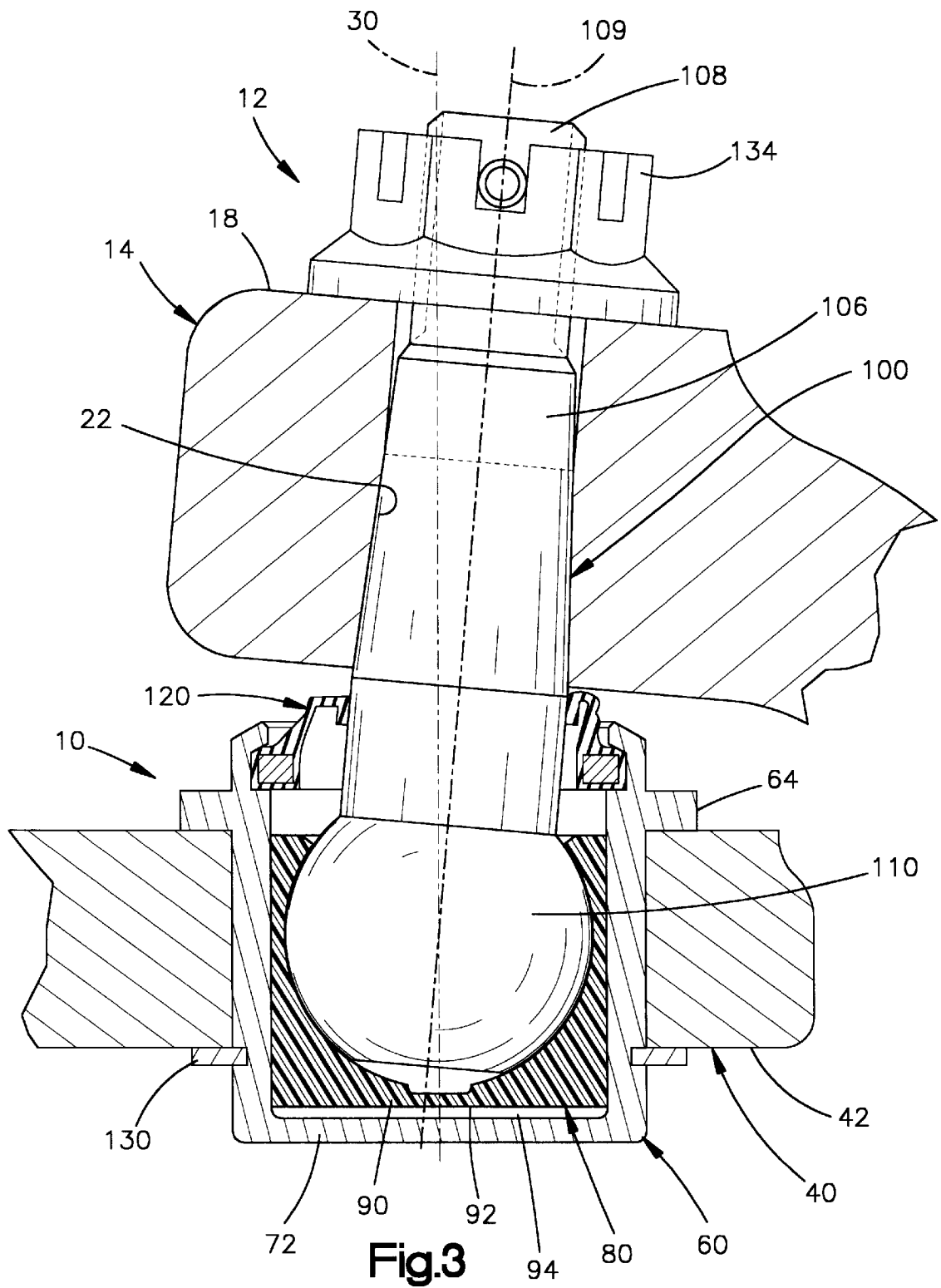
FIG. 3 is a view similar to FIG. 2, showing the ball joint in a second condition of assembly of the vehicle suspension.

If the upper steering yoke arm 18 is relatively close to the upper steering knuckle arm 42, then the upper ball joint 10 assumes a condition as shown in FIG. 3. In this condition, the ball stud 100 and the bearing 80 are located in the socket 60 so that the bearing is spaced farther from the first portion 122 of the seal 120. The end surface 92 of the bearing 80 is relatively close to the end wall 72 of the socket 60.

Therefore, because the ball stud 100 and the bearing 80 can move axially in the socket 60 of the upper ball joint 10, the steering yoke 14 and the steering knuckle 40 need not be made to extremely tight tolerances simply to avoid improper positioning of the upper and lower ball joints 10 and 50.

When the vehicle suspension 12 is assembled, the upper and lower openings 22 and 32 in the steering yoke 14 are ideally coaxial, along the steering axis 30, with each other and with both the upper and lower openings 46 and 48 in the steering knuckle 40. Because of manufacturing tolerances, however, it is unlikely that the all four of the openings 22, 32, 46 and 48 will be exactly coaxial. Such misalignment of the parts 14 and 40 of the suspension 12 can place undesired side loads on the ball joints 10 and 50, especially the upper ball joint 10, after the suspension is assembled.

These undesirable side loads are minimized because the ball stud 100 of the upper ball joint 10 is pivotable relative to the bearing 80 of the upper ball joint, so that the axis 109 of the ball stud is not parallel to the steering axis 30. Specifically, the ball stud 100 of the upper ball joint 10 can pivot about the pivot center 86, during assembly of the suspension 12, relative to the bearing 80 and the socket 60, so that the shank portion 102 of the ball stud 100 is received in the opening 22 in the upper steering yoke arm 18 in a coaxial relationship. The ball stud 100 of the upper ball joint 10 can then be secured to the upper steering yoke arm 18 with the nut 134, in a condition in which the upper ball joint is not stressed by side loads arising from misalignment or tolerance stackup of the suspension members 14 and 40 relative to the steering axis angle.

From the above description of the invention, those skilled in the art will perceive improvements, changes and modifications in the invention. Such improvements, changes and modifications within the skill of the art are intended to be covered by the appended claims.

Having described the invention, I claim:

1. A ball joint for supporting a first suspension member for movement relative to a second suspension member, the first and second suspension members defining a steering axis, said ball joint comprising:

a ball stud;

a socket having a chamber; and a bearing located in the chamber;

said ball stud having a shank portion for connecting said ball stud for movement with the first suspension member;

said socket having a mounting portion for connecting said socket for movement with the second suspension member;

said ball stud having a ball end portion received in said bearing and rotatable in said bearing to provide for relative movement between the first and second suspension members;

said ball stud and said bearing being movable together in the chamber relative to said socket and said second suspension member in a direction parallel to the steering axis;

said ball joint further comprising a seal having a first portion in sealing engagement with said socket and a second portion in sealing engagement with said ball stud, said bearing being movable axially in said socket between a position in engagement with said seal and a position out of engagement with said seal.

* * * * *